US012664720B2

(12) United States Patent
Kim et al.

(10) Patent No.: US 12,664,720 B2
(45) Date of Patent: Jun. 23, 2026

(54) VIRTUAL VIEWPOINT IMAGE SYNTHESIS DEVICE AND METHOD USING QUASI-UNIFORM SPHERICAL COORDINATE GRID

(71) Applicant: SEOUL NATIONAL UNIVERSITY R&DB FOUNDATION, Seoul (KR)

(72) Inventors: Young Min Kim, Seoul (KR); Changwoon Choi, Seoul (KR); Sang Min Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 120 days.

(21) Appl. No.: 18/671,585

(22) Filed: May 22, 2024

(65) Prior Publication Data

US 2024/0394957 A1 Nov. 28, 2024

(30) Foreign Application Priority Data

May 26, 2023 (KR) ........................ 10-2023-0068122

(51) Int. Cl.
*G06T 15/10* (2011.01)
*G06T 7/55* (2017.01)
(Continued)

(52) U.S. Cl.
CPC .............. *G06T 15/10* (2013.01); *G06T 7/55* (2017.01); *G06T 7/90* (2017.01); *G06T 15/08* (2013.01);
(Continued)

(58) Field of Classification Search
CPC . G06T 7/90; G06T 15/10; G06T 2207/20084; G06T 2207/10024;
(Continued)

(56) References Cited

U.S. PATENT DOCUMENTS

2010/0026683 A1* 2/2010 Araki ...................... G06T 17/20
345/420
2022/0239844 A1 7/2022 Lv et al.
(Continued)

FOREIGN PATENT DOCUMENTS

KR 10-2018-0040507 A 4/2018
KR 10-2019-0055228 A 5/2019
KR 10-2022-0071112 A 5/2022

OTHER PUBLICATIONS

Ben Mildenhall et al., "Nerf: Representing scenes as neural radiance fields for view synthesis", Communications of the ACM, Aug. 3, 2020, pp. 99-106, vol. 65, No. 1, 2021.
(Continued)

*Primary Examiner* — Phi Hoang
(74) *Attorney, Agent, or Firm* — Bridgeway IP Law Group, PLLC; Jihun Kim

(57) ABSTRACT

An image synthesis device includes a memory storing a virtual viewpoint image synthesis program, and a processor configured to execute the program. The program receives images of multiple viewpoints obtained by filming around a user, position information on the user, and information on a direction in which scene is viewed, estimates color and density by inputting the position information of the user and the direction in which the object is viewed to a neural radiance field model constructed by using the images of the multiple viewpoints, and synthesizes images of a virtual viewpoint by performing volume rendering by using estimated color and density, the neural network radiance field model is constructed based on a quasi-uniform spherical coordinate system, and the quasi-uniform spherical coordinate system includes a sum of a Yin grid and a Yang grid and has a grid structure that increases exponentially in a radial direction.

9 Claims, 6 Drawing Sheets

Input image      NeRF optimization      Output of virtual viewpoint image

(51) Int. Cl.
G06T 7/90 (2017.01)
G06T 15/08 (2011.01)
(52) U.S. Cl.
CPC ............... *G06T 2207/10024* (2013.01); *G06T 2207/20084* (2013.01)
(58) Field of Classification Search
CPC ........... G06T 15/08; G06T 7/55; G06T 15/20; G06T 5/50; G06T 3/18; H04N 13/156
See application file for complete search history.

(56) References Cited

U.S. PATENT DOCUMENTS

| | | | | |
|---|---|---|---|---|
| 2024/0062495 | A1* | 2/2024 | Shu ......................... | G06T 19/20 |
| 2024/0087214 | A1* | 3/2024 | Martin Brualla .... | H04N 13/111 |
| 2024/0386651 | A1* | 11/2024 | Liu ....................... | G06T 17/005 |
| 2025/0037244 | A1* | 1/2025 | Mildenhall .............. | G06T 5/60 |
| 2025/0037353 | A1* | 1/2025 | Chu ........................ | G06T 17/00 |

OTHER PUBLICATIONS

Changwoon Choi et al., "Balanced Spherical Grid for Egocentric View Synthesis", arxiv:2303.12408, Mar. 22, 2023.
Nobuaki Ohno et al., "Visualization of spherical data by Yin-Yang grid", Computer Physics Communications, 2009.

\* cited by examiner

Input image NeRF optimization Output of virtual viewpoint image

Figure 4:
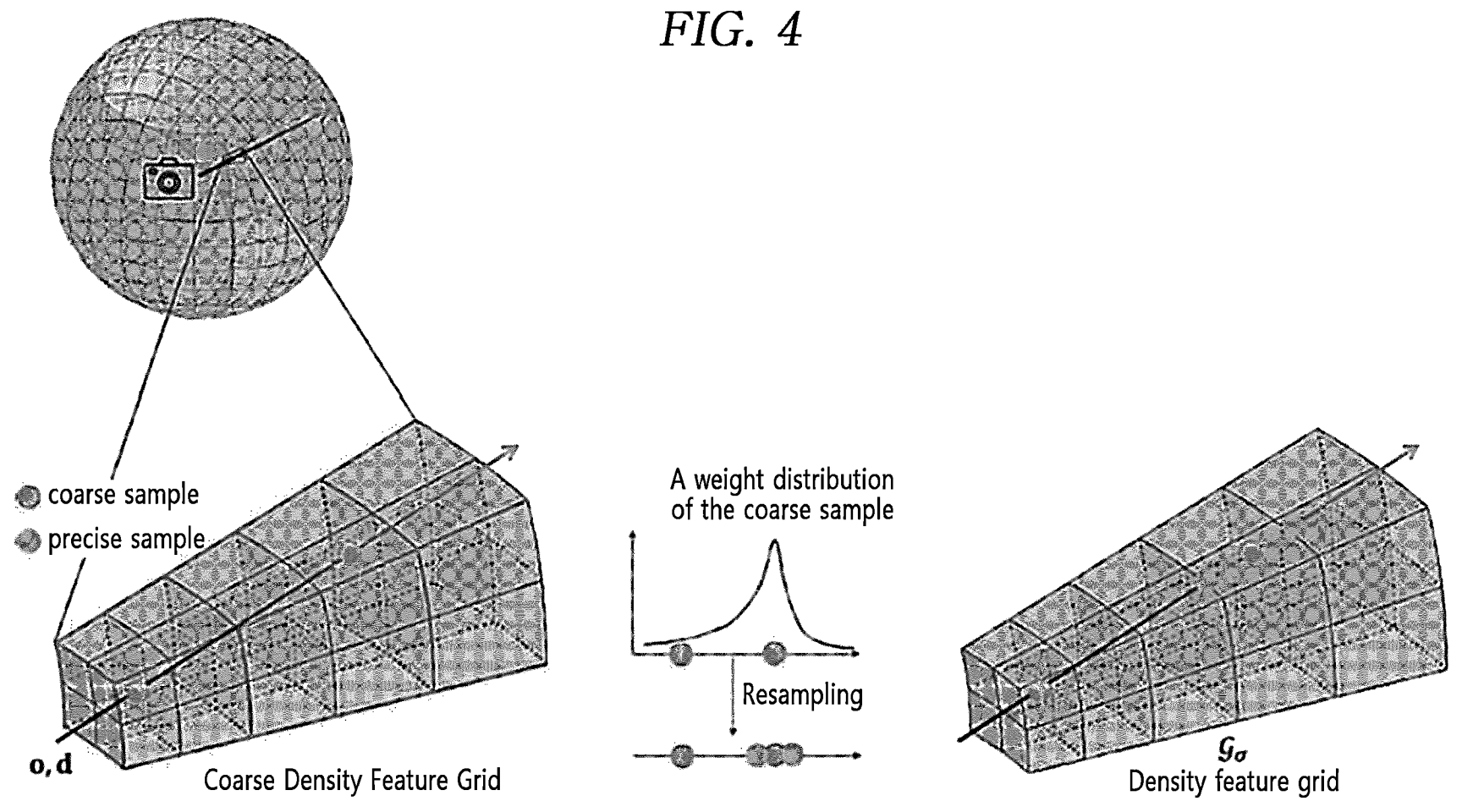

A weight distribution of the coarse sample

Resampling $g_\sigma$

Density feature grid coarse sample
precise sample

Coarse Density Feature Grid o, d

VIRTUAL VIEWPOINT IMAGE SYNTHESIS DEVICE AND METHOD USING QUASI-UNIFORM SPHERICAL COORDINATE GRID

CROSS-REFERENCE TO RELATED APPLICATION

This application is based on and claims priority to Korean Application No. 10-2023-0068122, filed on May 26, 2023 in the Korean Intellectual Property Office, the entire disclosures of which are incorporated herein by reference.

BACKGROUND

The present disclosure relates to a virtual viewpoint image synthesis device and method using a quasi-uniform spherical coordinate grid.

Recently, augmented reality (AR)/virtual reality (VR) technology has developed and interest in metaverse has increased, and thereby, interest in image processing technology that may synthesize realistic scenes from images obtained by filming actual scenes is increasing. In particular, research is in progress on a method of virtually reconstructing a large-scale three-dimensional space centered on a filming point.

Panoramic images may be used as one of methods used to visualize large-scale spaces. A panoramic image is a large image generated by stitching together several images filmed by a camera with a narrow angle of view and includes information on a large space. In particular, a case of a panoramic image including an angle of view of 360° may display a scene viewed from a specific point from an arbitrary direction. However, a panoramic image has a problem that a scene may not be visualized when a camera filming the scene is moved away from an original position.

In order to solve the problem, a capture method using a camera rig including multiple cameras attached to a spherical surface is known. When post-processing is performed after an image is captured by using a camera rig, an image viewed from a random position and in a random direction while moving around a filmed position may be generated. However, this requires a specially designed camera rig in which all pieces of information of a camera is measured, and accordingly, it is difficult for an average user to access, and daily filming is difficult in terms of portability and cost.

In order to solve the problem, the present disclosure may synthesize images viewed from a random position or in a random direction from a video briefly filmed by a general camera or a commercial camera.

In addition, there has been recent notable research achievement related to the synthesis of the virtual viewpoint images. This is technology known as neural radiance fields (NeRF), which may reconstruct a radiance field of a space where photos are taken by receiving multiple photos from multiple viewpoints as an input.

FIG. 1 illustrates views of a virtual viewpoint image synthesis process according to the conventional NeRF technology.

The NeRF technology constructs a learning model by using a spatial radiance field using a multilayer perceptron (MLP), and estimates color and density according to a spatial position of a user's viewpoint and a viewing direction by using the learning model. In this case, an MLP learning model is constructed based on a fully connected layer for taking three-dimensional (3D) position information and a direction from which scene is viewed as an input and for predicting color and density. Thereafter, the conventionally known volume rendering technique is used to generate an image viewed from a random viewpoint, and the learning model is optimized by using a gradient descent method to reduce an error with a training set image. In this way, after the learning model is constructed, a virtual viewpoint image viewed from a random viewpoint may be generated, and it is known to illustrate very realistic visualization performance that is not possible with the existing method.

However, since the NeRF technology models the entire space with one MLP, it takes a long time (12 hours to 2 days) to perform optimization by using a large MLP, and accordingly, the photo synthesis time also takes a long time. In addition, among the follow-up studies of NeRF, algorithms that model small MLPs by storing latent vectors in an explicit grid structure were proposed, and it was reported that the slow learning/rendering time of NeRf was improved. Also, a storage capacity required to express a volume is simplified by expressing a three-dimensional space as a product of low-dimensional vectors or matrices decomposed into each axis of a coordinate system. However, since the technologies use a grid on a Cartesian coordinate system, there is a problem in that the technologies are suitable for expressing objects of a limited size and it is difficult to model a large space. Specifically, not only a storage space increasing to $O(n^3)$ is required to store all large spaces on a three-dimensional (3D) grid, but also uniform resolution independent of camera position is very inefficient when modeling large spaces because an insufficient number of grids are used in regions close to a camera and too many grids are used in regions far from the camera.

In order to solve the conventional problems, the present disclosure provides a method of applying a speed improvement and capacity securing method of NeRF using a three-dimensional grid to a spherical coordinate system.

Examples of related art include Nerf: Representing scenes as neural radiance fields for view synthesis and Communications of the ACM, 65 (1): 99-106, 2021, (Ben Mildenhall, Pratul P Srinivasan, Matthew Tancik, Jonathan T Barron, Ravi Ramamoorthi, and Ren Ng).

SUMMARY

In order to solve the above-described problems, the present disclosure provides a virtual viewpoint image synthesis device and method for synthesizing virtual viewpoint images by using a neural network radiance field model constructed by a quasi-uniform spherical coordinate system.

Technical problems to be solved by the present embodiments are not limited to the technical problems described above, and there may be other technical problems.

According to an aspect of the present disclosure, an image synthesis device capable of synthesizing virtual viewpoint images, a memory storing a virtual viewpoint image synthesis program, and a processor configured to execute the virtual viewpoint image synthesis program, wherein the virtual viewpoint image synthesis program receives images of multiple viewpoints obtained by filming around a user, position information on the user, and information on a direction in which scene is viewed, estimates color and density by inputting the position information of the user and the direction in which the object is viewed to a neural radiance field model constructed by using the images of the multiple viewpoints, and synthesizes images of a virtual viewpoint by performing volume rendering by using estimated color and density. In this case, the neural network radiance field model is constructed based on a quasi-uniform spherical coordinate system, and the quasi-uniform spherical coordinate system includes a sum of a Yin grid and a Yang grid and has a grid structure that increases exponentially in a radial direction. A latent vector corresponding to a special three-dimensional position may be efficiently expressed by externally combining a low-dimensional vector of the grid with a value stored in a matrix.

According to another aspect of the present disclosure, an image synthesis method of virtual viewpoint image synthesis device includes receiving, by the virtual viewpoint image synthesis device, images of multiple viewpoints obtained by filming around a user, position information on the user, and information on a direction in which scene is viewed, estimating, by the virtual viewpoint image synthesis device, color and density by inputting the position information of the user and the direction in which the object is viewed to a neural radiance field model constructed by using the images of the multiple viewpoints, and synthesizing, by the virtual viewpoint image synthesis device, images of a virtual viewpoint by performing volume rendering by using estimated color and density. In this case, the quasi-uniform spherical coordinate system includes a sum of a Yin grid and a Yang grid and has a grid structure that increases exponentially in a radial direction.

BRIEF DESCRIPTION OF THE DRAWINGS

Embodiments of the inventive concept will be more clearly understood from the following detailed description taken in conjunction with the accompanying drawings in which:

FIG. 3 illustrates a quasi-uniform spherical coordinate system that is used when constructing a neural network radiance field model of a virtual viewpoint image synthesis program, according to an embodiment of the present disclosure;

FIG. 4 illustrates a density estimation method using hierarchical sampling, according to an embodiment of the present disclosure;

DETAILED DESCRIPTION OF THE EMBODIMENTS

Figure 1:
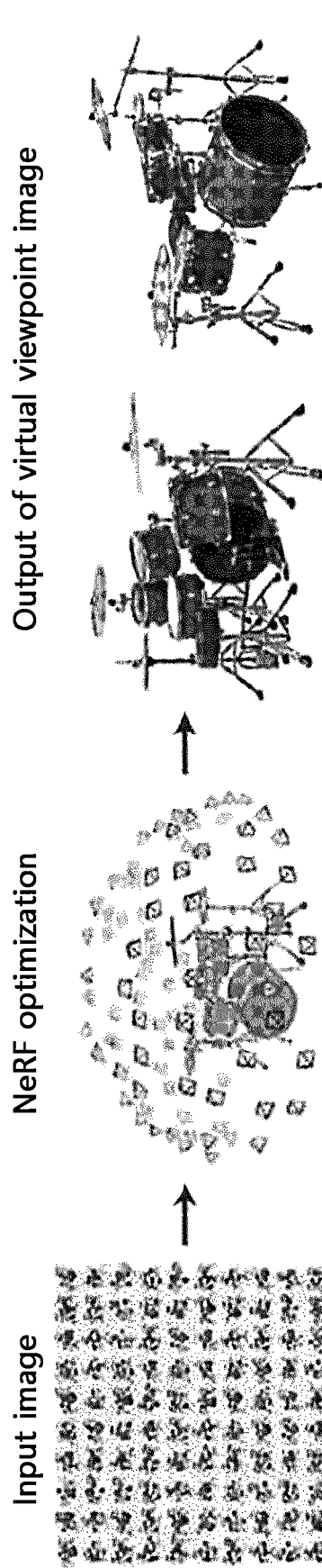
FIG. 1 illustrates views of a virtual viewpoint image synthesis process according to the conventional NeRF technology.

Hereinafter, embodiments of the present disclosure will be described in detail with reference to the accompanying drawings such that those skilled in the art in which the present disclosure belongs may easily practice the present disclosure. However, the present disclosure may be implemented in many different forms and is not limited to the embodiments described herein. In addition, in order to clearly describe the present disclosure, parts irrelevant to the description are omitted in the drawings, and similar reference numerals are attached to similar parts throughout the specification.

When it is described that a portion is "connected" to another portion throughout the specification, this includes not only a case where the portion is "directly connected" to another portion but also a case where the portion is "electrically connected" to another portion with another component therebetween. In addition, when it is described that a portion "includes" a certain component, this means that the portion may further include another component without excluding another component unless otherwise stated.

In the present disclosure, a "portion" includes a unit realized by hardware, a unit realized by software, and a unit realized by using both. In addition, one unit may be realized by using two or more pieces of hardware, and two or more units may be realized by using one piece of hardware. Meanwhile, a "~ portion" is not limited to software or hardware, and a "~ portion" may be configured to be included in an addressable storage medium or may be configured to reproduce one or more processors. Therefore, in one example, "~ portion" refers to components, such as software components, object-oriented software components, class components, and task components, and includes processes, functions, properties, and procedures, subroutines, segments of program code, drivers, firmware, microcode, circuits, data, databases, data structures, tables, arrays, and variables. The functions provided within the components and "portions" may be combined into a smaller number of components and "portions" or may be further separated into additional components and "portions". Additionally, components and "portions" may be implemented to regenerate one or more central processing units (CPUs) included in a device or security multimedia card.

An "image synthesis device" to be described below may be implemented by a computer or portable terminal that may be connected to a server or another terminal through a network. Here, a computer may include, for example, a laptop computer or a desktop computer in which a web browser is stored, and a mobile terminal is, for example, a wireless communication device that guarantees portability and mobility, and may include all types of handheld wireless communication devices, such as various mobile communication-based terminals, smartphones, and tablet personal computers (PCs). Also, a "network" may include a wired network, such as a local area network (LAN), wide area network (WAN), or value added network (VAN), and any type of wireless network, such as a mobile radio communication network, or a satellite communication network.

Figure 2:
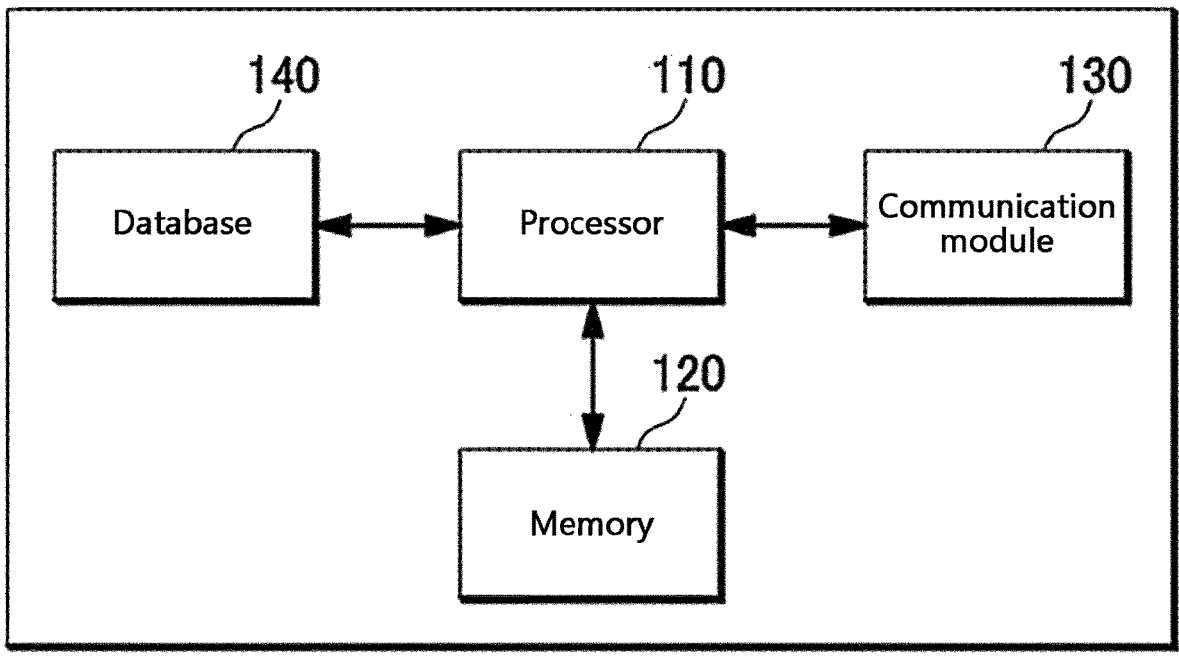
FIG. 2 is a block diagram illustrating a configuration of an image synthesis device according to an embodiment of the present disclosure.

FIG. 2 is a block diagram illustrating a configuration of an image synthesis device according to an embodiment of the present disclosure.

An image synthesis device 100 may include a processor 110 and a memory 120 and may further include a communication module 130 and a database 140. Also, the image synthesis device may be connected to a camera (not illustrated) that captures images. The image synthesis device 100 synthesizes images of a plurality of viewpoints and images of a virtual viewpoint that are not actually filmed. As such, the image synthesis device 100 may be implemented by a server that provides virtual viewpoint images. In this case, when the image synthesis device 100 functions as a server, the image synthesis device 100 may operate in a cloud computing service model, such as software as a service (SaaS), platform as a service (PaaS), or infrastructure as a service (IaaS). Also, the image synthesis device 100 may be constructed in a form, such as a private cloud, a public cloud, or a hybrid cloud.

The memory 120 may store a virtual viewpoint image synthesis program. The virtual viewpoint image synthesis program synthesizes images of virtual viewpoints according to a neural network radiance field model constructed by using images of multiple viewpoints. In this case, the neural network radiance field model of the present disclosure is constructed based on a quasi-uniform spherical coordinate system, and the quasi-uniform spherical coordinate system is composed of the sum of a Yin grid and a Yang grid and has exponentially increasing grid structure in a radial direction.

Also, the memory 120 temporarily or permanently stores the data processed by the processor 110. Here, the memory 120 may include volatile storage media or non-volatile storage media, but the scope of the present disclosure is not limited thereto.

The processor 110 executes a virtual viewpoint image synthesis program stored in the memory 120. Also, the processor 110 performs various control operations for operating the image synthesis device 100. The processor 110 may refer to, for example, a data processing device which includes a physically structured circuit to perform a function expressed by code or instructions included in a program and is constructed in hardware. The data processing device constructed in hardware may include, for example, a microprocessor, a central processing unit (CPU), a processor core, a multiprocessor, an application-specific integrated circuit (ASIC), a field programmable gate array (FPGA), or a graphics processing unit (GPU), but the scope of the present disclosure is not limited thereto.

The communication module 130 may include one or more components that transmit and receive various types of data to and from an external computing device or camera. For example, various image data may be received through the communication module 130, and the synthesized virtual viewpoint image may be transmitted to another computing device. The communication module 130 may be a device including hardware and software required to transmit and receive signals, such as control signals or data signals, through wired or wireless connections to other network devices.

The database 140 may manage various types of data required to execute a virtual viewpoint image synthesis program. The database 140 may store image data required to construct a neural network radiance field model, or store a virtual viewpoint image synthesized by the neural network radiance field model.

Hereinafter, a detailed structure of the virtual viewpoint image synthesis program is described.

Figure 3:
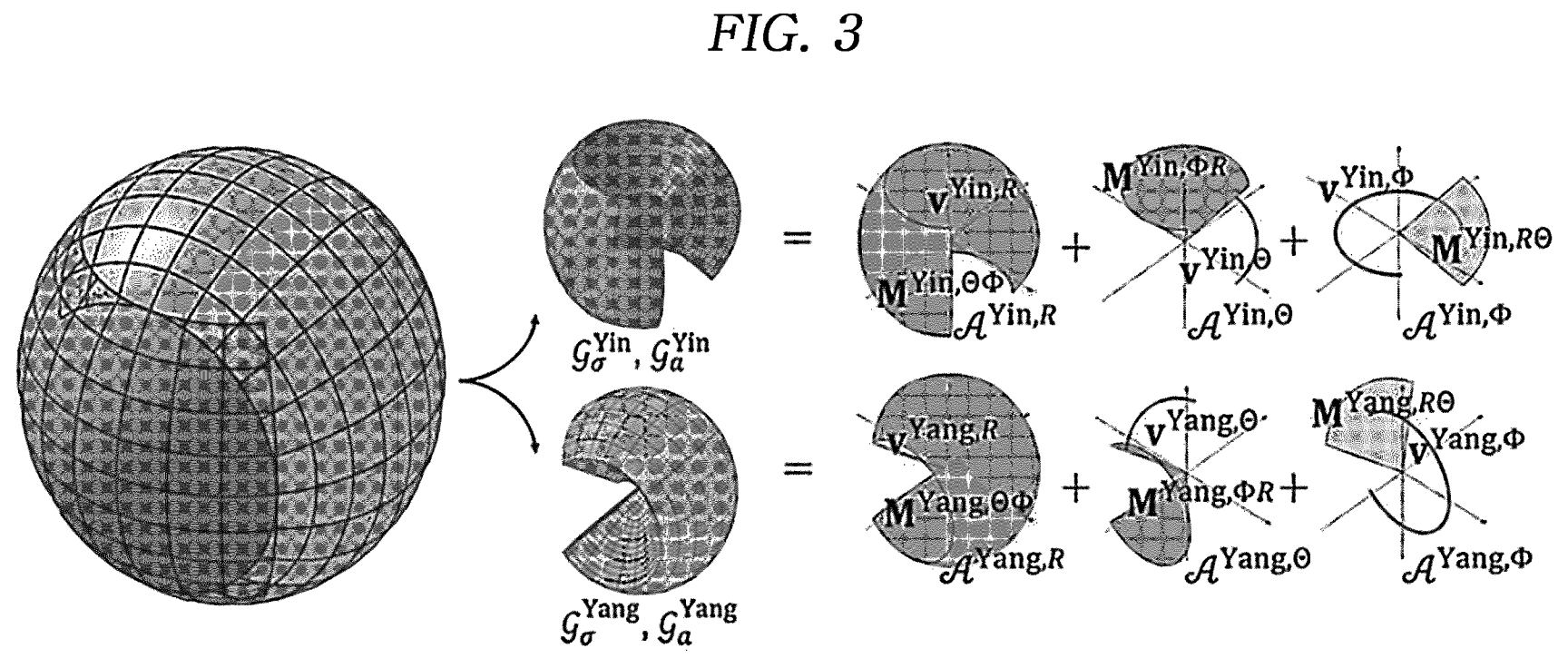

FIG. 3 illustrates a quasi-uniform spherical coordinate system used when constructing a neural network radiance field model of a virtual viewpoint image synthesis program, according to an embodiment of the present disclosure.

Since the conventional NeRF technology uses a grid on a Cartesian coordinate system, there is a problem that it is difficult to model only a small space. Specifically, not only a storage space increasing to $O(n^3)$ is required to store all large spaces on a three-dimensional (3D) grid, but also uniform resolution independent of camera position is very inefficient when modeling large spaces because an insufficient number of grids are used in regions close to a camera and too many grids are used in regions far from the camera.

In order to solve the problem, the present disclosure constructs a neural network radiance field model based on a multilayer perceptron (MLP) model of the conventional NeRF and uses a quasi-uniform spherical coordinate system when constructing the neural network radiance field model. With this configuration, high-resolution rendering may be made for nearby objects by using a small grid, and a memory may be used efficiently for distant regions by using a large grid. Also, by using a quasi-uniform coordinate system on a spherical surface, a radial pattern occurring in rendering due to singular points at both poles of the spherical coordinate system may be removed. Finally, by simultaneously optimizing environment lighting (an environment map) existing at an infinite position along with values of the spherical coordinate system grid, a distant region, such as the sky, may be modeled. As a result, virtual viewpoint synthesis may be performed in both synthetic data and actual data with faster optimization and a less error compared to the known methods.

As illustrated in FIG. 3, the quasi-uniform spherical coordinate system includes the sum of a Yin grid and a Yang grid, and the Yin grid is defined by Equation 1 below.

$$\left(\pi/4 \le \theta \le 3\pi/4\right) \cap \left(-3\pi/4 \le \phi \le 3\pi/4\right) \qquad \text{Equation 1}$$

where $\theta$ represents colatitude (90°-latitude), and $\phi$ represents longitude.

Also, the Yang grid is identical to the Yin grid, and through rotation transformation, an axis is located at an equator of the Yin grid. A determinant for the rotation transformation is represented by Equation 2 below.

$$\begin{bmatrix} x^{Yin} \\ y^{Yin} \\ z^{Yin} \end{bmatrix} = \begin{bmatrix} -1 & 0 & 0 \\ 0 & 0 & 1 \\ 0 & 1 & 0 \end{bmatrix} \begin{bmatrix} x^{Yang} \\ y^{Yang} \\ z^{Yang} \end{bmatrix} \qquad \text{Equation 2}$$

Also, the quasi-uniform spherical coordinate system has an explicit grid structure that increases exponentially in a radial direction, as represented by Equation 3 below.

$$r_i^y = r_0 k^{i-1}, \quad R_{max} = r_0 k^{N_r^y - 1} \qquad \text{Equation 3}$$

Here, $R_{max}$ represents a largest radius of a grid, and $r_0$ is defined as an interval of the first grid. k refers to a geometric ratio of a geometric sequence indicating that a size of a grid increases by k times as a distance r from an original point increases, assuming that an index of each column of the grid is i.

In this way, the quasi-uniform spherical coordinate system according to the present disclosure defines an angle part and a radius part.

Also, while a neural network radiance field model is constructed based on an MLP model of the conventional NeRF, density and color are defined as follows.

That is, the density is stored in an explicit grid structure $G_\sigma$ defined by Equation 4.

$$G_\sigma \in R^{2N_r^y \times N_\theta^y \times N_\phi^y} \qquad \text{Equation 4}$$

Also, a latent vector indicating the color is stored in the explicit grid structure $G_a$ defined by Equation 5.

$$G_a \in R^{2N_r^y \times N_\theta^y \times N_\phi^y \times C} \qquad \text{Equation 5}$$

In Equation 5, a numerical number 2 indicates the number of grids (the Yin grid and the Yang grid) and indicates the number $N_r$ of radial directions, the number $N_\theta$ of grid directions, and the number $N_\varphi$ of longitude directions.

As such, in the present disclosure, a spatial radiance field is stored in an explicit grid, and optimization faster than 10 times may be made by using a method in which a latent vector is combined with a small MLP.

In addition, the density at a viewing position x and in a direction vector d viewed from a corresponding position is defined by Equation 6, and the color is defined by Equation 7. As such, in the present disclosure, density and color may be defined by using an explicit grid.

$$\sigma(x) = T(G_\sigma, x) \qquad \text{Equation 6}$$

$$c(x, d) = f_{MLP}(T(G_a, x), d) \qquad \text{Equation 7}$$

T indicates trilinear interpolation.

In addition, $f_{MLP}$ indicates a small MLP that decodes features in an artificial neural network into color. $f_{MLP}$ may be configured with three layers or less which is much less than the existing NeRF's 10 layers and 256 dimensional MLPs.

In addition, for memory efficiency and low-dimensional regularization, a grid structure may be decomposed into the following vector-matrix components.

$$G_\sigma^y =$$

$$\sum_{n=1}^{N_a} v_{\sigma,n}^{y,R} \otimes M_{\sigma,n}^{y,\Theta\Phi} + v_{\sigma,n}^{y,\theta} \otimes M_{\sigma,n}^{y,\Phi R} + v_{\sigma,n}^{y,\Phi} \otimes M_{\sigma,n}^{y,R\Theta} = \sum_{n=1}^{N_a} \sum_{m\in R\Phi\Theta} A_{\sigma,n}^{y,m}$$

$$G_a^y = \sum_{n=1}^{N_a} A_{a,n}^{y,R} \otimes b_{3n-2}^y + A_{a,n}^{y,\Theta} \otimes b_{3n-1}^y + A_{a,n}^{y,\Phi} \otimes b_{3n}^y$$

$$G_\sigma = \bigcup_{y\in Y} G_\sigma^y, \ G_a = \bigcup_{y\in Y} G_a^y, \ Y = \{\text{Yin, Yang}\}$$

Equation 8

In addition, in the present disclosure, a hierarchical density estimation method is used when constructing a neural network radiance field model.

FIG. 4 illustrates a density estimation method using hierarchical sampling, according to an embodiment of the present disclosure.

Because a 3D space is mostly empty, it is important to select a more efficient ray sample through hierarchical sampling.

The conventional NeRF model samples multiple points in a space through which the ray passes and then uses the sampled multiple points for rendering, and hierarchical sampling for sampling each point proportional to a predicted effect in the final rendering is used. That is, a configuration for sampling points of a ray by using two networks, such as a coarse network and a fine network, is used.

Likewise, the present disclosure uses a configuration for estimating density by using hierarchical sampling. As illustrated in FIG. 4, for a basic grid structure $G_\sigma$ based on a quasi-uniform spherical coordinate system, a coarse grid $$G_\sigma^c$$

is obtained, and density based on the coarse sampling is estimated based thereon. For example, the coarse sampling may be performed in units of coarse grid including two grids indicated by red lines. Specifically, as represented by Equation 10 below, a coarse grid is obtained by applying a convolution kernel K to the basic grid, and based on this, the density of the coarse grid is sampled as many as Nc, and by using this, a weight distribution of the coarse sample is obtained, and then the density is additionally sampled by $N_f$ through precision sampling.

$$\sigma(x_{coarse}) = T(G_\sigma^c, x_{coarse}) = T(K * G_\sigma, x_{coarse}) \qquad \text{Equation 10}$$

In addition, by using the density sampled from the coarse grid, the weight for precise sampling may be calculated as represented by equation 11 below.

$$w_i = \tau_i(1 - e^{-\sigma_i\delta_i}), \ i \in [1, N_c], \tau_i = e^{-\sum\sigma_j\delta_j} \qquad \text{Equation 11}$$

$\delta$ represents an interval between samples obtained through coarse sampling, and $\tau$ represents the accumulated transmittance. A probability distribution is generated based on a result of the coarse sampling, and $N_f$ pieces of density are resampled through precise sampling.

In this way, the present disclosure performs hierarchical sampling, and resampling is performed based on the results of coarse sampling to perform precise sampling on a portion with a large weight distribution, and therethrough, key data may be sampled more intensively.

Next, volume rendering is performed based on values obtained through hierarchical sampling to generate a virtual viewpoint image.

A process of the volume rendering is the same as the conventional NeRF configuration.

$\hat{C}(r)$ represents an expected color of a camera ray and shows a result of the volume rendering in a direction of a ray d based on a camera or user's position o.

$$\hat{C} = \sum_{i=1}^{N} \tau_i(1 - e^{-\sigma(x_i)\delta_i})c(x_i, d) + \tau_{N+1}c_{env}(d) \qquad \text{Equation 12}$$

N represents the number of samples ($N=N_c+N_f$), and density and color are respectively obtained by Equation 6 and Equation 7. Since the quasi-uniform spherical coordinate system of the present disclosure increases exponentially in a radial direction, a sample obtained through coarse sampling may be distributed exponentially.

In addition, in Equation 12, $C_{env}$ represents environment lighting (an environment map) existing at an infinite position. For example, in order to express scene located at an infinite distance, such as the sky, the environment lighting is optimized simultaneously with the values of a spherical coordinate system grid. Therethrough, it is possible to model regions existing far away, such as the sky.

$$c_{env}(d) = \mathcal{E}(u, v; d) \qquad \text{Equation 13}$$

In this case, a sampling position (u, v) is a function that depends on only a viewing angle d, and is simultaneously optimized during a learning process.

Also, Equation 14 may be used as a loss function for calculating a difference between the image acquired through volume rendering and a learning image.

$$\mathcal{L} = \frac{1}{|\mathcal{R}|} \sum_{r \in \mathcal{R}} \left\| \hat{C}(r) - C(r) \right\|_2^2$$
<span style="float:right">Equation 14</span>

$\mathcal{R}$ represents a randomly sampled ray batch, $\hat{C}(r)$ represents a result of the volume rendering, and C(r) represents a correct image. By using the loss function, feature grids $G_\sigma$ and $G_a$, $f_{MLP}$, and environment lighting according to the present disclosure may all be optimized.

Thereafter, in order to optimize a neural network radiance field model, a value of each grid of the quasi-uniform spherical coordinate system or a weight value of the small MLP may be updated by using a gradient descent method, based on an error value of the loss function described above. In addition, the processes described above, such as hierarchical sampling and volume rendering, are repeatedly performed.

Figure 5:
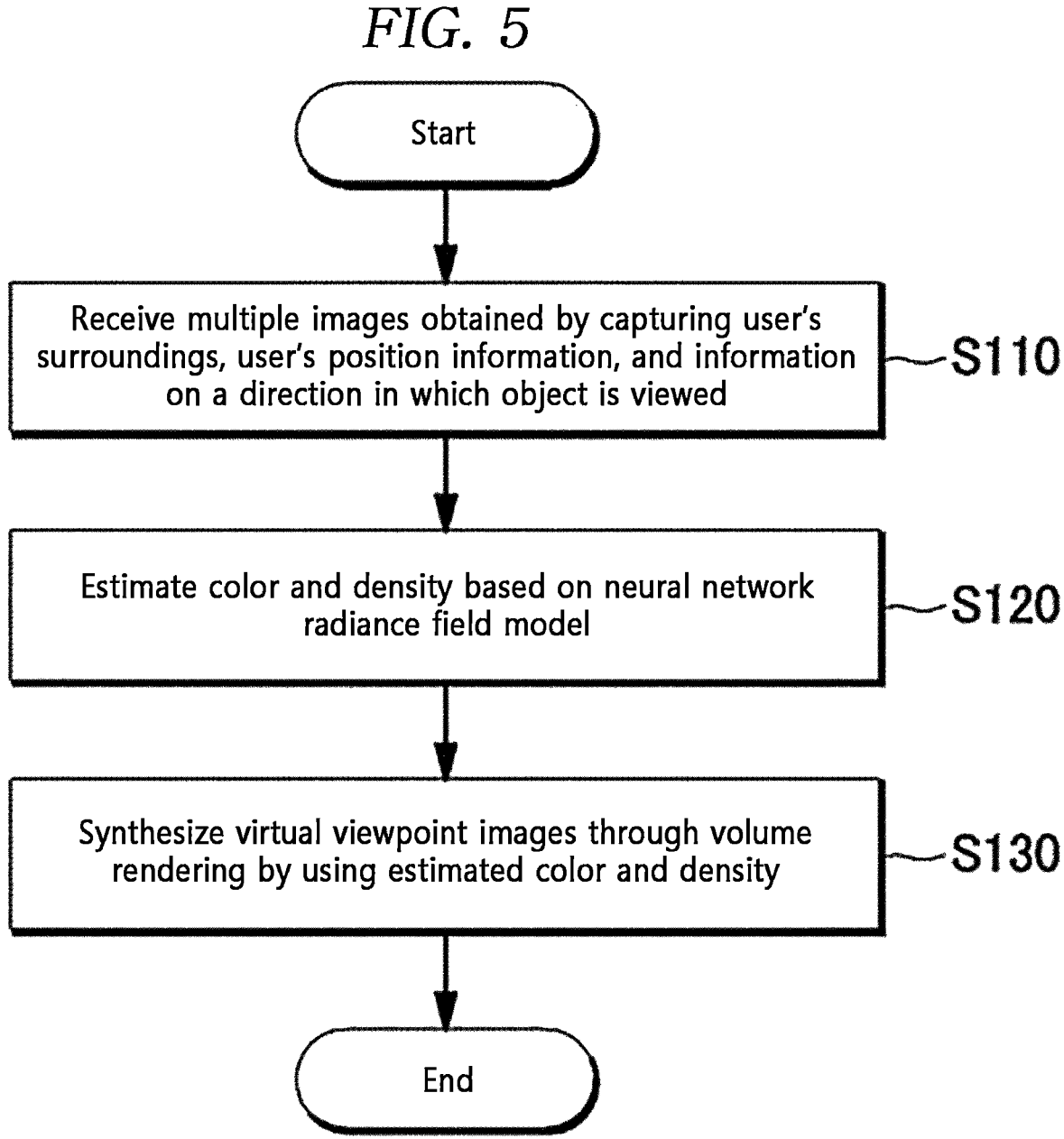
FIG. 5 is a flowchart illustrating an image synthesis method of a virtual viewpoint image synthesis device, according to an embodiment of the present disclosure.

FIG. 5 is a flowchart illustrating an image synthesis method of a virtual viewpoint image synthesis device, according to an embodiment of the present disclosure.

First, a virtual viewpoint image synthesis device 100 receives position information of a user's viewpoint and information on a direction in which scene is viewed (S110). As in the neural network radiance field model of the conventional NeRF technology, the virtual viewpoint image synthesis device 100 receives position information that is a reference point for a viewpoint and information on a viewing direction. Unlike the conventional NeRF technology, the quasi-uniform spherical coordinate system is used, and accordingly, the position information and the viewing direction may be determined in a direction radiating outward from an original point of the spherical coordinate system. For example, such input information may be determined by an input device, such as a mouse or touch input on a display that outputs images, or by a user's gaze input or head rotation detection information in a wearable virtual reality (VR) device.

Next, the virtual viewpoint image synthesis device 100 inputs the position information of a user's viewpoint and a direction in which scene is viewed, which are received prior to a neural network radiance field model constructed by using images from multiple viewpoints, thereby estimating color and density therethrough (S120).

In this case, the neural network radiance field model is constructed based on a quasi-uniform spherical coordinate system, and the quasi-uniform spherical coordinate system includes the sum of a Yin grid and a Yang grid and has a grid structure that increases exponentially in a radial direction.

Also, in estimating the density, the density is estimated by using the hierarchical sampling described above, and a step of obtaining a coarse grid from the quasi-uniform spherical coordinate system, obtaining $N_c$ density values by performing coarse sampling based on a coarse grid, and then obtaining $N_f$ density values through precise sampling.

Also, the density obtained in this way is input to Equation 7 described above to estimate color information through a small MLP.

Next, volume rendering is performed by using the estimated color and density to synthesize images of a virtual viewpoint (S130). The known technology is used for a volume rendering technique. However, when performing the volume rendering of the present disclosure, the volume rendering is performed by considering environment lighting elements.

Figure 6:
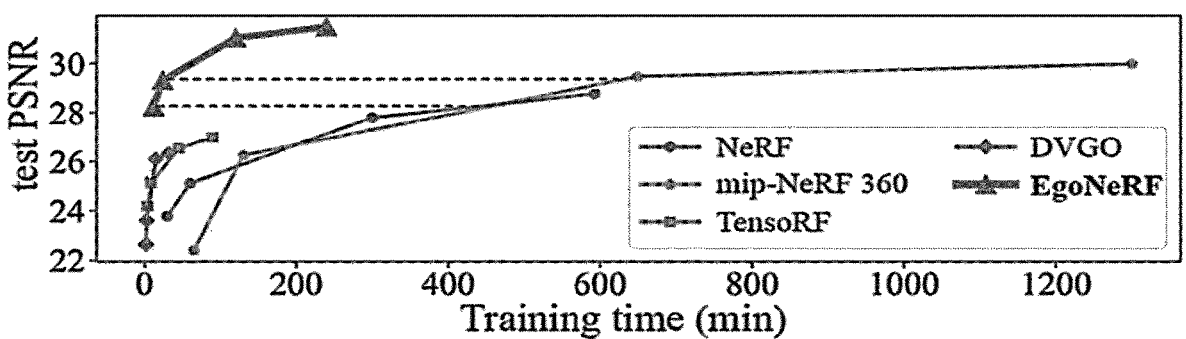
FIG. 6 is a diagram illustrating a performance improvement effect of a virtual viewpoint image synthesis device according to the present disclosure.

FIG. 6 is a diagram illustrating a performance improvement effect of a virtual viewpoint image synthesis device according to the present disclosure.

The technique of the present disclosure is named EgoNeRF, and for reference, EgoNeRF is named egocentric NeRF in the sense that the EgoNeRF generates a viewpoint image viewed outward from the center of a user.

The conventional NeRF technique may take a considerable amount of learning time because the conventional NeRF technique is based on an MLP learning model. The present disclosure uses a small MLP learning model by using an explicit grid structure, and thus, a learning speed and image synthesis speed may be increased. Also, it can be seen that a maximum signal-to-noise ratio (PSNR) is further improved compared to the conventional TensoRF and DVGO methods based on a Cartesian coordinate system.

According to the present disclosure, when constructing a neural network radiance field model, a 3D space may be expressed from simplified data by expressing the 3D space as a combination of vectors on a coordinate system. In this case, the quasi-uniform spherical coordinate system is used, a nearby object may be rendered at high resolution by using a small grid, and a memory may be used efficiently by using a large grid for remote regions. Also, by utilizing a quasi-uniform coordinate system on a spherical surface, a radial pattern occurring during rendering due to singular points existing at both poles of a spherical coordinate system may be reduced. Finally, by simultaneously optimizing environment lighting (an environment map) existing at an infinite position along with values of a spherical coordinate system grid, a distant region, such as the sky, may be modeled. As a result, virtual viewpoint synthesis may be performed in both synthetic data and actual data with faster optimization and a less error compared to the known methods.

A method according to an embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the method and system of the present disclosure are described with respect to specific embodiments, some or all of components or operations thereof may be implemented by using a computer system having a general-purpose hardware architecture.

The above descriptions of the present disclosure are for illustrative purposes only, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and similarly, components described in a distributed manner may also be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An image synthesis device capable of synthesizing virtual viewpoint images, the image synthesis device comprising:

a memory storing a virtual viewpoint image synthesis program; and a processor configured to execute the virtual viewpoint image synthesis program, wherein the virtual viewpoint image synthesis program receives images of multiple viewpoints obtained by filming around a user, position information on the user, and information on a direction in which a scene is viewed, estimates a color and a density by inputting the position information of the user and the direction in which an object is viewed to a neural radiance field model constructed by using the images of the multiple viewpoints, and synthesizes images of a virtual viewpoint by performing volume rendering by using the estimated color and the estimated density, wherein the neural radiance field model is constructed based on a spherical coordinate system, wherein the spherical coordinate system includes a sum of a Yin grid and a Yang grid and has a grid structure that increases exponentially in a radial direction, and wherein, in the spherical coordinate system, the Yin grid is defined by an equation below, and the Yang grid is identical to the Yin grid and has an axis located at an equator of the Yin grid through rotation transformation $(\pi/4 \leq \theta \leq 3\pi/4) \cap (-3\pi/4 \leq \phi \leq 3\pi/4)$ where $\Theta$ indicates colatitude and $\phi$ indicates longitude.

2. The image synthesis device of claim 1, wherein the neural radiance field model estimates the density through hierarchical sampling, obtains a coarse grid from the spherical coordinate system, performs coarse sampling based on the coarse grid to obtain a first number of density values, and then obtains a second number of density values through precise sampling.

3. The image synthesis device of claim 1, wherein the neural radiance field model performs the volume rendering by considering an environment lighting element when performing the volume rendering.

4. The image synthesis device of claim 1, wherein the neural radiance field model represents the scene using an explicit grid structure $(G_\sigma)$ that stores density values and an explicit grid structure $(G_a)$ that stores latent vectors indicative of the color, and wherein the explicit grid structure $(G_\sigma)$ and the explicit grid structure $(G_a)$ are decomposed into vector-matrix components corresponding to axes of the spherical coordinate system.

5. An image synthesis method of virtual viewpoint image synthesis device, the image synthesis method comprising:

receiving, by the virtual viewpoint image synthesis device, images of multiple viewpoints obtained by filming around a user, position information on the user, and information on a direction in which a scene is viewed;

estimating, by the virtual viewpoint image synthesis device, a color and a density by inputting the position information of the user and the direction in which an object is viewed to a neural radiance field model constructed by using the images of the multiple viewpoints; and synthesizing, by the virtual viewpoint image synthesis device, images of a virtual viewpoint by performing volume rendering by using the estimated color and the estimated density, wherein the neural radiance field model is constructed based on a spherical coordinate system, and wherein the spherical coordinate system includes a sum of a Yin grid and a Yang grid and has a grid structure that increases exponentially in a radial direction, and wherein in the spherical coordinate system, the Yin grid is defined by an equation below, and the Yang grid is identical to the Yin grid and has an axis located at an equator of the Yin grid through rotation transformation $(\pi/4 \leq \theta \leq 3\pi/4) \cap (-3\pi/4 \leq \phi \leq 3\pi/4)$ where $\Theta$ indicates colatitude and $\phi$ indicates longitude.

6. The image synthesis method of claim 5, wherein, in the estimating of the color and the density, the density is estimated through hierarchical sampling, a coarse grid is obtained from the spherical coordinate system, coarse sampling is performed based on the coarse grid to obtain a first number of density values, and then a second number of density values are obtained through precise sampling.

7. The image synthesis method of claim 5, wherein, in the synthesizing of the images of the virtual viewpoint by performing the volume rendering, the volume rendering is performed by considering an environment lighting element when performing the volume rendering.

8. The image synthesis method of claim 5, wherein the neural radiance field model represents the scene using an explicit grid structure $(G_\sigma)$ that stores density values and an explicit grid structure $(G_a)$ that stores latent vectors indicative of the color, and wherein the explicit grid structure $(G_\sigma)$ and the explicit grid structure $(G_a)$ are decomposed into vector-matrix components corresponding to axes of the spherical coordinate system.

9. A non-transitory computer-readable recording medium on which a computer program for performing the image synthesis method according to claim 5 is recorded.

* * * * *